(12) United States Patent
Hanusiak et al.

(10) Patent No.: US 10,360,022 B2
(45) Date of Patent: Jul. 23, 2019

(54) SOFTWARE DISCOVERY SCAN OPTIMIZATION BASED ON PRODUCT PRIORITIES

(71) Applicant: INTERNATIONAL BUSINESS MACHINES CORPORATION, Armonk, NY (US)

(72) Inventors: Tomasz Hanusiak, Cracow (PL); Michal Klak, Zielonki (PL); Konrad W. Komnata, Cracow (PL); Konrad K. Skibski, Zielonki (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 207 days.

(21) Appl. No.: 14/994,175

(22) Filed: Jan. 13, 2016

(65) Prior Publication Data

US 2017/0199735 A1 Jul. 13, 2017

(51) Int. Cl.
*G06F 8/70* (2018.01)
*G06F 16/14* (2019.01)
*G06F 8/60* (2018.01)

(52) U.S. Cl.
CPC .......... *G06F 8/70* (2013.01); *G06F 8/60* (2013.01); *G06F 16/148* (2019.01)

(58) Field of Classification Search
CPC ...... G06F 8/60–68; G06F 8/70; G06F 3/1225; G06F 3/123; G06F 11/3672; G06F 17/301–30109; G06F 16/14–156; H04L 41/082; H04L 41/085–0853; H04L 41/0866–0869; H04L 41/0889

USPC ............... 717/120, 168–178; 709/220–222; 707/706, 758
See application file for complete search history.

(56) References Cited

U.S. PATENT DOCUMENTS 5,732,275 A * 3/1998 Kullick .................. G06F 8/65
 713/1
7,197,493 B2 * 3/2007 Ashby ............... G06F 17/30265
7,895,654 B1 2/2011 Millard
(Continued)

OTHER PUBLICATIONS

Anonymous, "Method and apparatus for optimization of time constrained file system hierarchy scanning", https://priorart.ip.com/IPCOM/000196581; IP.com Disclosure No. IPCOM000196581D; published Jun. 7, 2010; 2 pgs.

*Primary Examiner* — Todd Aguilera
(74) *Attorney, Agent, or Firm* — Cantor Colburn LLP; Richard Wilhelm (57) ABSTRACT

An advanced method for a software discovery process may be provided. The method comprises receiving a product identifier comprising at least one mandatory software item and a related product priority. The method includes further determining a scan type for each mandatory software item of all product identifiers of all received related product priorities, performing a priority-based software discovery, using a next scan type for each of the at least one mandatory software items for each of the at least one product identifiers for each of the received product priorities, starting with a highest priority, requiring the next scan type, and repeating the previous step of performing the priority-based software discovery with a next scan type until all scan types for mandatory software have been executed.

17 Claims, 4 Drawing Sheets

(56) References Cited

U.S. PATENT DOCUMENTS

| | | | |
|---|---|---|---|
| 8,296,732 B2* | 10/2012 | Fraley | G06F 9/44505 |
| | | | 715/735 |
| 8,332,509 B2* | 12/2012 | Robertson | H04L 41/0853 |
| | | | 709/220 |
| 8,819,649 B2* | 8/2014 | Lafreniere | G06F 8/41 |
| | | | 717/139 |
| 8,881,131 B2 | 11/2014 | Capomassi et al. | |
| 9,875,095 B2* | 1/2018 | Hanusiak | G06F 8/70 |
| 10,146,569 B2* | 12/2018 | Hanusiak | G06F 9/5077 |
| 2002/0104092 A1* | 8/2002 | Arai | H04N 5/445 |
| | | | 725/87 |
| 2003/0120673 A1* | 6/2003 | Ashby | G06F 17/30265 |
| 2008/0235611 A1* | 9/2008 | Fraley | G06F 9/44505 |
| | | | 715/772 |
| 2011/0208855 A1* | 8/2011 | Robertson | H04L 41/0853 |
| | | | 709/224 |
| 2013/0067441 A1* | 3/2013 | Lafreniere | G06F 8/41 |
| | | | 717/139 |
| 2013/0080511 A1 | 3/2013 | Majka et al. | |

* cited by examiner

SOFTWARE DISCOVERY SCAN OPTIMIZATION BASED ON PRODUCT PRIORITIES

BACKGROUND

The invention relates generally to a method for a software discovery process. The invention relates further to a software discovery system, and a computer program product.

Modern data centers are advantageously managed using system management software or software asset management systems. Otherwise, the required work for system operators managing complex IT environments is hardly achievable. These software asset management systems may need comprehensive data about installed software of the computing systems under control in order to comply with enterprise licenses agreements, compliance rules and/or other enterprise regulations.

However, there may be circumstances that lead to a mismatch between software products that may be registered in a software directory, e.g. a registry, and software that is actually installed and used on a given computing system or peripheral device. In order to properly manage the computing systems, due to compliance rules, and in order to manage user licenses according to contractual agreements, it may be required to have a clear understanding about supposedly installed software and actually installed software on a given computing system and/or a data center landscape.

Normally, generating a complete overview on all installed software components in complex IT environments is a heavy burden for the underlying IT systems, i.e., hardware, operating systems and middleware. In some cases also application software may also be affected by performance degradation due to an automatic software discovery process running as a background task. System managers try to optimize the task of software discovery, however, often times with limited success.

Several approaches have been used and some experimentation goes on to map discovered software to tracked software in software catalogs. None of these methods and systems is perfect or guarantees 100% recognition in either way: discovered software vs. registered software or registered software vs. discovered software. There are always mismatches that require a labor intensive manual compare and match process, and a focus on the most important software components is currently not really possible because software discovery systems handle each component in the same way.

SUMMARY

This need may be addressed by a method for a software discovery process, a software discovery system, a computing system, and a computer program product, according to the independent claims.

According to one aspect of the present invention, a method for a software discovery process may be provided. The method may comprise receiving at least one product identifier and a related product priority. The product identifier may be indicative of a software product comprising at least one mandatory software item. The method may further comprise determining a scan type for each of the at least one mandatory software items of all product identifiers of all received related product priorities for performing a priority-based software discovery in a given file system, performing the priority-based software discovery, starting with a first scan type, using a next scan type for each of the at least one mandatory software items for each of the at least one product identifiers for each of the received product priorities—starting with a highest priority—requiring the next scan type. Thereby, product identifier and software item specific parameters may be used for the next scan type. Last but not least, the method may comprise repeating the previous step of performing the priority-based software discovery with a next scan type until all scan types for mandatory software have been executed.

According to another aspect of the present invention, a software discovery system may be provided. The software discovery system may comprise a receiving unit adapted for receiving at least one product identifier and a related product priority. The product identifier may be indicative of a software product comprising at least one mandatory software item.

The software discovery system may also comprise a determination unit adapted for determining a scan type for each of the at least one mandatory software items of all product identifiers of all received related product priorities for performing a priority-based software discovery in a given file system stored on a storage system and a software discovery sub-system adapted for performing the priority-based software discovery—starting with a first scan type—using a next scan type for each of the at least one mandatory software items for each of the at least one product identifiers for each of the received product priorities, starting with a highest priority, requiring the next scan type. Product identifier and software item specific parameters may be used for the next scan type. Additionally, the software discovery sub-system may also be adapted for repeating the previous step of performing the priority-based software discovery with a next scan type until all scan types for mandatory software have been executed.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

BRIEF DESCRIPTION OF THE DRAWINGS

It should be noted that embodiments of the invention are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

Preferred embodiments of the invention will be described, by way of example only, and with reference to the following drawings.

DETAILED DESCRIPTION

In the context of this description, the following conventions, terms and/or expressions may be used:

The term 'software discovery process' may denote searching a file system—or a similar organization of electronic files stored in/on a storage system—of a computing system and finding installed software or similar software elements. Similar elements may also comprise data collections like catalogs or other inventories. A software product may be identified by using several characteristics or parameters of this particular software product. A software product may be identifiable by a product identifier. Each software product may also comprise a plurality of software items which may be grouped in (a) mandatory software items—but at least one software item—and (b) optional or non-mandatory software items. A mandatory software item may be one that may build a core functionality of a software product. Optional software items may represent implemented add-on functionalities of a core software product.

The term 'product priority' may denote a number or a letter—or in general, one out of a character sequence defining a sequence of priorities—assigned by a user or another software program to a given product identifier. This way, different product identifiers may be treated with different importance in the software discovery process.

The term 'mandatory software item' may denote a software item which may be necessary for a software program, one which may always be present for a given software product. It may define the core functionality of a software product. Optional software items may also be denoted as non-mandatory software items. They may be omitted during a software discovery process.

The term 'scan type' may denote a specific way to search for software items. For example, one scan type may test a software item for its size in bytes; another scan type may look for a certain character sequence, e.g., a name. Again another scan type may look for different character sequences in a header of the software item. The header of a software item may comprise more detailed information about the software item like a version number, a reason number, a specific software identification number, a vendor name, a long name or commercial name of the software, additional explanations regarding the software or, other software specific information instrumental for identifying a software item related to a specific software product.

The term 'software item specific parameters' may denote identifiable data instrumental for a determination that a specific software item may be related to a specific software product. The specific parameters may also be dependent on a specific product identifier; thus, the parameters may be "product identifier and software item specific". Examples of parameters have been discussed in the paragraph above already.

The term 'software catalog' may denote a collection of software product names, related software items and additional data useful for identifying software components or software items of a specific software product. This type of data may be denoted a parameter. The software catalog may also comprise additional information about a specific software product, like an installation procedure, an installation history, a version and release history, links to help information, and so on.

The term 'optimized scan script' may denote an executable script which may be equipped with required information and parameters to identify software items according to a parameter list and according to specific predefined priorities. The scan script may be optimized in a way that it may only be required to execute the script only once and for identifying all software items relating to the input information, e.g., parameters. Hence, it may not be necessary to run the same scan script several times for identifying software items requiring different parameters for identifying different software items. The optimized scan script of a certain type may run only once as part of the software discovery process. Hence, each script related to exactly one scan type may run only once as part of the discovery process. No loops for the same scan script using different parameters are required.

The proposed method for a software discovery process may offer a couple of advantages and technical effects:

By defining priorities for software products to be discovered, i.e., product identifiers representing software products, a software discovery process may be optimized such that only those software products undergo a discovery process that have a predefined priority. In some cases, it may be sufficient to identify only specific software applications relating to a predefined set of product identifiers. These product identifiers may, e.g., all relate to software applications of a specific vendor. Thus, not a complete software discovery process may be required. This may result in a much faster software discovery process because it may not be searched for each and every software item. Only those software items could be identified in a given file system which may be mandatory for a specific software product. This may be, e.g., the core of the software product, and may exclude all optional software products which may also be used in conjunction with the core of the software product. Thus, the differentiation between mandatory software items and optional software items of a software product may represent a second optimization level as part of the inventive concept.

Even if a longer list of product identifiers with a plurality of priorities may have been used as input for the inventive method or software discovery system, the method may be interrupted—in particular, after identifying software items of a specific priority may have been identified—in order to shrink the computational effort for a sort of "high level software discovery process". Thus, system managers of complex computing environments may be enabled to manage software discovery processes with more precision and flexibility and—at the same time—keep negative effects of the software discovery processes at a minimum.

In the following, a detailed description of the figures will be given. All instructions in the figures are schematic. Firstly, a block diagram of an embodiment of the inventive method for a software discovery process is given. Afterwards, further embodiments as well as embodiments of the software discovery system will be described.

Figure 1:
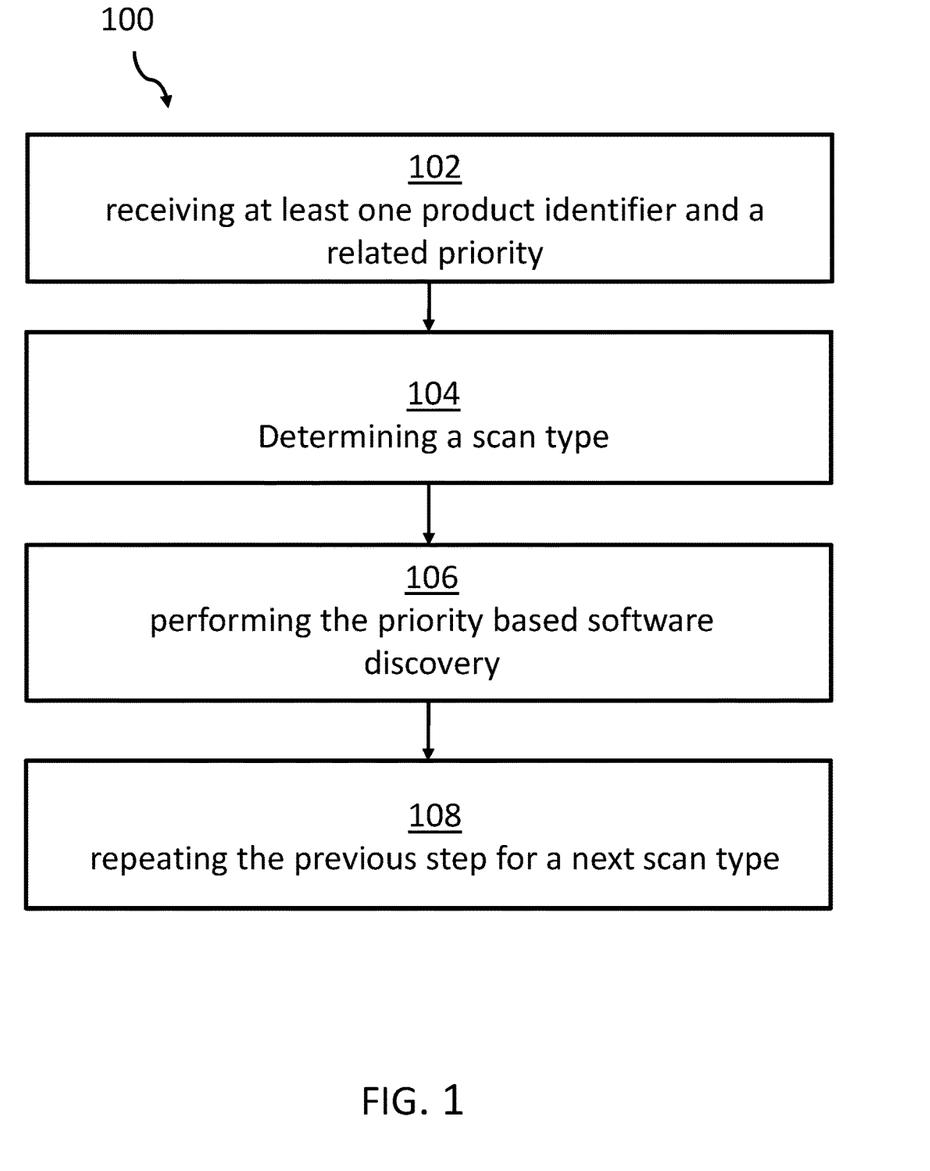
FIG. 1 shows a block diagram of an embodiment of the inventive method for a software discovery process.

FIG. 1 shows a block diagram of an embodiment of the method 100 for the software discovery process 100. The method 100 may comprise receiving, 102, at least one product identifier. The at least one product identifier or a plurality of product identifiers may be received via a user interface from a user or, it may be received from another software process, e.g., from a software asset management system. Additionally, with each product identifier a related product priority may be received. The at least one product identifier may be indicative of a software product comprising at least one mandatory software item. Software products may be composed of mandatory and optional software items. The optional software items may, e.g., be extensions to a base product. The mandatory and optional or non-mandatory software items may be identifiable by a software catalog or a software knowledge base.

The method also comprises determining, 104, a scan type for each of the at least one mandatory software items of all product identifiers of all received related product priorities—in particular, starting with the highest priority—for performing a priority-based software discovery in a given file system, e.g., a directory tree, a registry or any other storage location in which software items may be stored. Furthermore, the method comprises performing, 106, the priority-based software discovery using a next scan type—starting with a first scan type—for each of the at least one mandatory software items for each of the at least one product identifiers for each of the received product priorities, starting with a highest priority, requiring the next scan type. For this, product identifier and software item specific parameters are used for the next scan type. In general, the scan type may define which parameter(s) may be used for identifying a specific software item. This may be performed, e.g., by looking for the file name of the software item, file size, specific header information of the file, and so on.

Additionally, the method comprises repeating, 108, the previous step of performing the priority-based software discovery. Now, a next scan type may be used until all scan types for mandatory software have been executed.

Next, specific embodiments enhancing the core inventive concept are described.

According to one preferred embodiment of the method 100, the first scan type may relate to a first mandatory software item of a first product identifier having a highest related priority. Thus, it may be ensured that the software discovery process starts with the most relevant products and software items reflecting also the priority set for a specific program product to be identified. An advantage of this priority setting may lie in the fact that even if the software discovery process may be interrupted, the most important software products may have been identified already via its mandatory software items.

According to one optional embodiment of the method 100, information about mandatory and/or optional software items of a product identifier may be received from software catalog. The software catalog may be supplied by a vendor or may be maintained by system operators responsible for a specific computing environment, i.e., data center. This way, a definition of mandatory and or optional, i.e., non-mandatory, software items may be implementable in a flexible way.

Additionally, and according to another permissive embodiment of the method, the parameters for scanning the filesystem for a software item may also be receivable from the same or an additional software catalog. This may also apply to related values for the parameters. Advantageously, the same software catalog may be used. This way, information about software products, scan types, parameters and required values for the parameters may come from a single source.

According to an advantageous embodiment of the method 100, the determining 104 a scan type may also comprise generating (compare also FIG. 2, 212) an optimized scan script using different parameters for different scan types. The optimized scan script may reflect that different software items of different products may be searched by using different parameters. However, the discovery process, i.e., search, may only be performed once but may use the different parameters and/or parameter values for the different software items. This may ensure a low impact to the underlying computing system. Additionally, it may ensure a fast discovery process.

According to one further optional embodiment of the method 100, the performing 106 a software discovery may also comprise performing a software discovery for non-mandatory or optional software items of each software product. This may have an impact on the optimized scan script because the additional parameters have to be used during the execution of one scan type. However, there may be no need to perform a second execution of the same scan script using parameters for optional software items. This may reduce the overall execution time for the software discovery process. However, in this case, the overall execution time may be longer than for the case of searching mandatory software items only.

According to one advantageous embodiment of the method 100, the determining a scan type for each of the at least one mandatory software items of all product identifiers may also comprise determining a scan type for each of an optional, i.e., non-mandatory software item of each of the product identifiers. This may be the case if a different scan type may be required for non-mandatory software items of the same product identifier. Thus, it may be possible that mandatory and non-mandatory software items may require different scan types.

According to one additional advantageous embodiment of the method 100, the priority-based software discovery may be interruptible after each related product priority. This may have the advantage that it may not be required to search for all products and all priorities. It may be possible to interrupt the software discovery process after all mandatory software items of product identifiers with the highest priority have been discovered. This may be a useful approach if product identifiers relating to one vendor may have been assigned the highest priority for the discovery process. In this case, all software products relating to the one vendor may have been identified within a short amount of time and only little impact on the underlying computing systems.

According to a preferred embodiment of the method 100, the at least one product identifier may be receivable via a user interface, e.g., a web interface, or from another data source. This other data source may be another program or process executed on the same underlying computing system or, another computing system, e.g., a dedicated software asset management system. This way, the proposed software discovery system is flexible in the way it receives its base data from.

Figure 2:
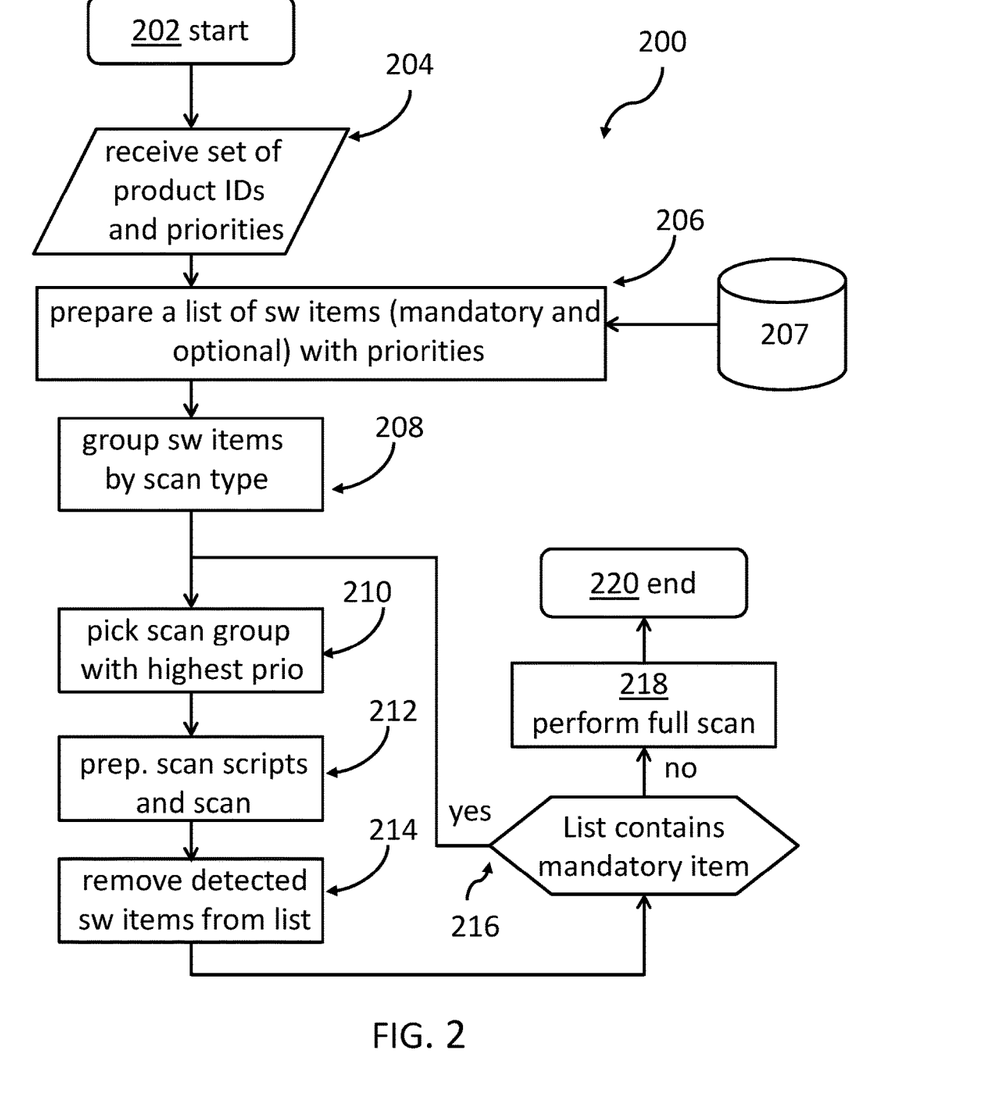
FIG. 2 shows a more detailed block diagram of an embodiment of the inventive method.

FIG. 2 shows a more detailed block diagram 200 of an embodiment of the inventive method 100. The flow starts at 202. Initially, a set or plurality of product identifiers and related priorities are received, 204. As mentioned above, these data may be received via a user interface or from another software application like a software asset management system. Next, a list of software items may be prepared, 206, using, e.g., a software knowledge base 207 or software catalog, including the related priorities. At this stage, mandatory and optional, i.e., non-mandatory software items may be included in the list. Additional information about the software items of the software products identifiable by the product identifiers may be received from a software catalog 207. This may also include information about a required scan type.

Then, the software items may be grouped, 208, by scan type. As a consequence, software items belonging to different product identifiers may be grouped together because they require the same scan type.

At 210, a group of software items belonging to the same scan group having the highest priority may be selected (or picked). As a next step, optimized scan scripts may be prepared and the scan process, i.e., software discovery process, may be executed, 212. The just detected software items may be removed, 214, from the list. Then, it may be determined, 216, whether the list still contains mandatory software items. In case of "yes", the process returns back to picking a next scan group with a next highest priority, compare 210.

In case of "no" of the determination 216 a full scan, i.e., a full discovery process also including optional or non-mandatory software items may be performed, 218, optionally. This may ensure that installed software products may be identified in a given computing environment. However, this last step 218 may represent a heavy computational burden for the underlying computing system. Therefore, this step may be optional. The process may end at 220.

Until now, it has not been mentioned that each time the process comes to the block "pick scan group with highest priority", 210, it may be decided to stop the software discovery process. In such a case, only software items, i.e., software products of a certain priority may have been identified/discovered already. However, this may reduce the computational burden for the underlying computing system. In another embodiment, the described process may be interruptible also at other stages of the method with a consequence that only some of the received product identifiers representing software products and related mandatory software items may have been found.

A more detailed example may render the underlying inventive concept more comprehensively.

At the beginning of a software discovery process, a user may provide a list of software products, i.e., product identifiers like, Product 1, Product 2, Product 3, Product 4 and Product 5. The user may also define a priority for the discovery process for each of the software products, wherein 1 is the highest priority and subsequent numbers refer to a lower significance for the software priority process; e.g.: Product 1 (1), Product 2 (2), Product 3 (2), Product 4 (2), Product 5 (3); here, the numbers in brackets may define the priority. It may be noted that when all software products may be given the same priority only one iteration of the underlying algorithm may be required if also the scan type is identical.

By using a software knowledge base, e.g. a software catalog, the proposed method finds the main or mandatory discoverable software items and bundled/related items for each product from the received list. Main items are related to priorities from the user provided list while bundled, related, optional or, not-mandatory ones may have undefined priority (*) at this stage, e.g., Product 1 (1)={Item 1,1 (1), Item 1,2 (1), Item 1,3 (*), Item 1,4 (*), Item 1,5 (*)}. In this case item 1,1 (1) may define a 1st software item of Product 1 with the priority 1. Software item 3 of Product 1 may have an undefined priority "*". Accordingly, in this example, the priorities for Product 2 may be defined as Product 2 (2)={Item 2,1 (2), Item 2,2 (2), Item 2,3 (*)}.

For the sake of simplicity, the rest of the products are not considered in this example. For each software item in each product, the method finds the required scan type (A, B, C, etc.) and necessary parameters of the scan type, e.g., Product 1 (1)={
Item 1,1 (1) Scan A [parameters A,1,1], (1st item of product 1 for scan type A with priority 1),
Item 1,2 (1) Scan B [parameters B, 1,1], (1st item of product 1 for scan type B with priority 1),
Item 1,3 (*) Scan A [parameters A,1,2], (2nd item of product 1 for scan type A with undefined priority),
Item 1,4 (*) Scan C [parameters C,1,1], (1st item of product 1 for scan type C with undefined priority),
Item 1,5 (*) Scan D [parameters D,1,1]} (1st item of product 1 for scan type D with undefined priority),
Product 2 (2)={
Item 2,1 (2) Scan A [parameters A,2,1], (1st item of product 2 for scan type A with priority 2),
Item 2,2 (2) Scan C [parameters C,2,1], (1st item of product 2 for scan type C with priority 2),
Item 2,3 (*) Scan D [parameters D,2,1]} (1st item of product 2 for scan type D with undefined priority).

Having done that, the method moves to the execution phase. It will iterate over the provided priorities, i.e., 1 then 2 and finally undefined priority (*). From all scan types, the method only chooses those scan types where the software items with known priorities are, e.g., items with priority 1 are taken for the first iteration. In the exemplary case: Scan A and Scan B.

Appropriate scan scripts (here A and B) are prepared to find only parameters from the below list:
Scan A
Item 1,1 (1) Scan A [parameters A,1,1]
Item 1,3 (*) Scan A [parameters A,1,2]
Item 2,1 (2) Scan A [parameters A,2,1]
Scan B
Item 1,2 (1) Scan B [parameters B, 1,1]
Scan A and scan B are performed on the computing environment, i.e., file system(s), directories, registries, etc.
Then, this iteration ends.

The second iteration starts with priority 2 as parameter. Next, Scan C is chosen to perform. Appropriate scan scripts (C only) are prepared to find the parameters from the list:
Scan C
Item 1,4 (*) Scan C [parameters C,1,1],
Item 2,2 (2) Scan C [parameters C,2,1],
Scan C is performed on the environment.
End of iteration.

Next, optionally a last loop may start with unknown priority (*). From all scanning types the method may choose those scanning types where software items are those with the unknown priority. In the example used here: Scan D.

Appropriate scan scripts (D only) are prepared to find the software items from the list:
Scan D
Item 1,5 (*) Scan D [parameters D,1,1]
Item 2,3 (*) Scan D [parameters D,2,1]
Scan D is performed on the environment.
End of iteration.

Once the list of provided products is covered, the algorithm performs optionally a full scan to complete the software discovery.

Figure 3:
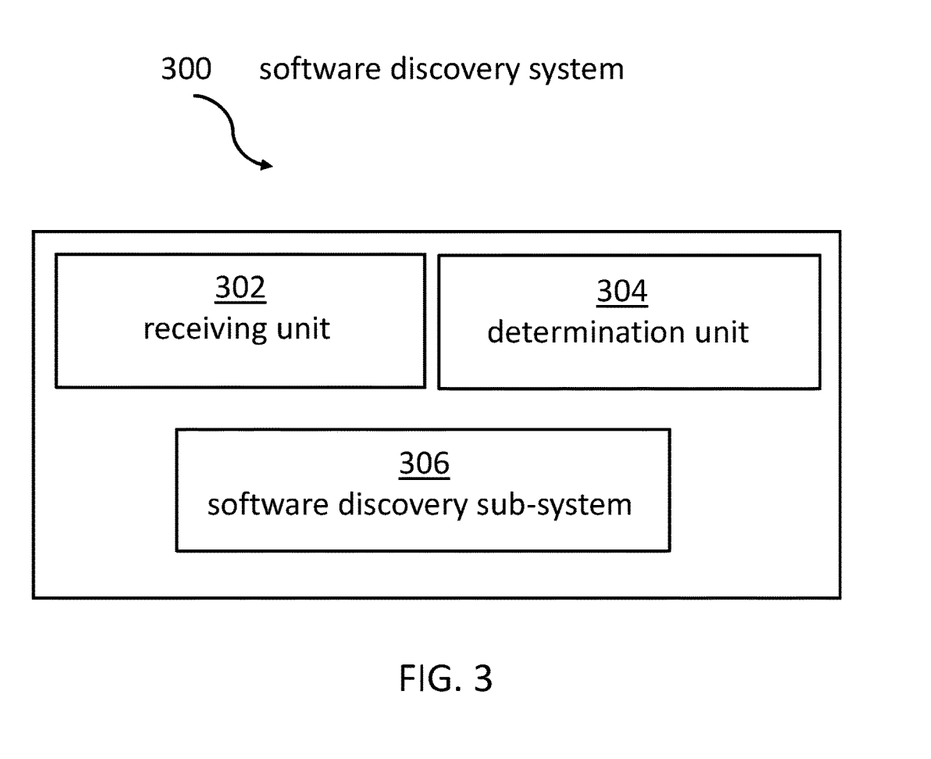
FIG. 3 shows a block diagram of an embodiment of the inventive software discovery system.

FIG. 3 shows a block diagram of an embodiment of the software discovery system 300. It comprises a receiving unit 302. It receives at least one product identifier and a related product priority. The product identifier is typically indicative of a software product. Each named software product may comprise at least one mandatory software item. Hence, if a product identifier is not related to at least one mandatory software item, it may not be regarded as valid product identifier. The receiving unit 302 may be connected to a data feed (not shown) providing product identifiers like, e.g., a user interface comprising a data entry unit to be managed by a user or, a data channel for communicating product identifiers from a software asset management system.

Furthermore, a determination unit 304 is adapted for determining a scan type for each of the at least one mandatory software items. This may be done for all product identifiers of all received related product priorities. Based on this, a priority-based software discovery may be performed in a given file system or registry or any other storage storing software items of software products.

A software discovery sub-system 306 is adapted for performing the priority-based software discovery. It may start the priority-based software discovery with using a first scan type. In order to execute a given algorithm, a next scan type for each of the at least one mandatory software items for each of the at least one product identifiers for each of the received product priorities may be used. The hard-coded algorithm may start with a highest priority of a product identifier which may require the next scan type. For this, product identifier and software item specific parameters are used for a next scan type. The software discovery sub-system is also adapted for repeating the previously executed loop step of performing the priority-based software discovery with a next scan type until all scan types for mandatory software items have been executed. This way, it may be ensured that all mandatory software items of all product identifiers and all priorities may be addressed within one cycle of the software discovery system.

Figure 4:
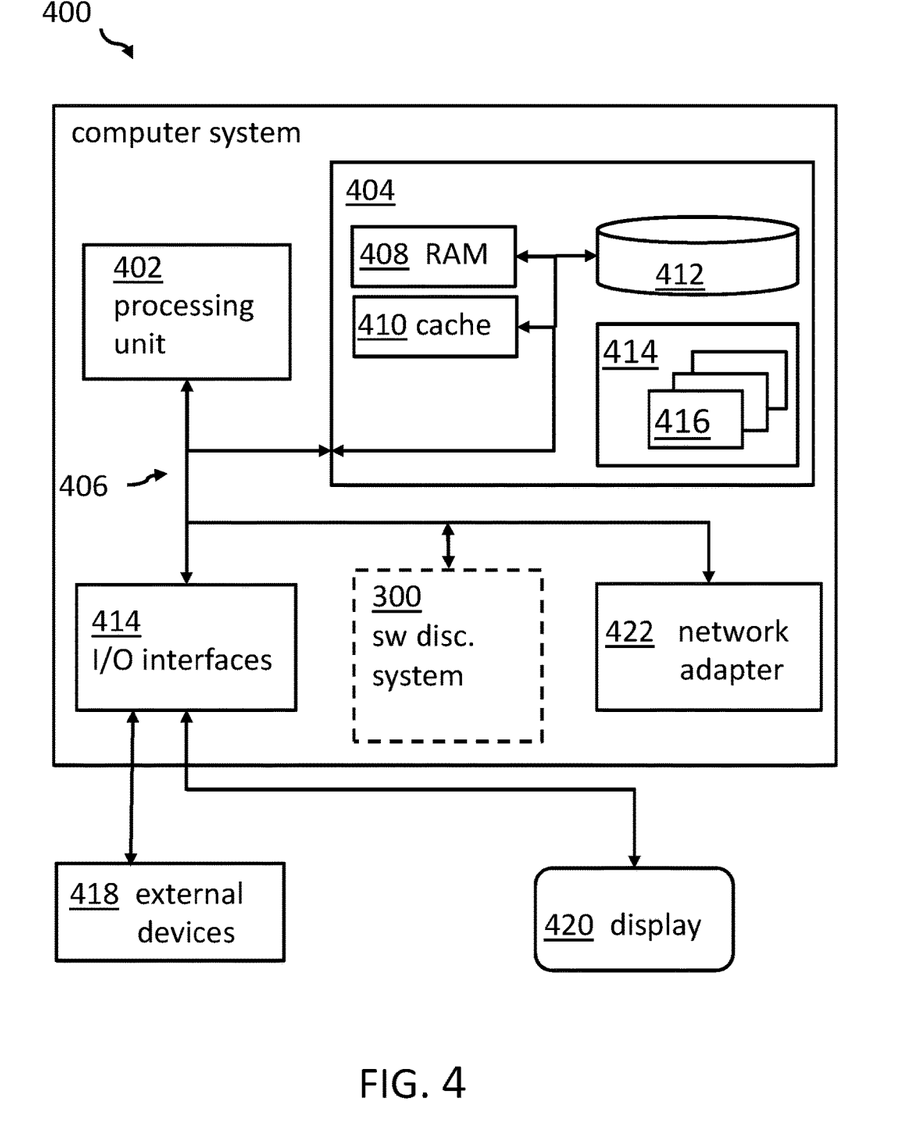
FIG. 4 shows an embodiment of a computing system comprising the software discovery system.

Embodiments of the invention may be implemented together with virtually any type of computer, regardless of the platform being suitable for storing and/or executing program code. FIG. 4 shows, as an example, a computing system 400 suitable for executing program code related to the proposed method.

The computing system 400 is only one example of a suitable computer system and is not intended to suggest any limitation as to the scope of use or functionality of embodiments of the invention described herein. Regardless, computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 400 is shown in the form of a general-purpose computing device. The components of computer system/server 400 may include, but are not limited to, one or more processors or processing units 402, a system memory 404, and a bus 406 that couples various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random access memory (RAM) 408 and/or cache memory 410. Computer system/server 400 may further include other removable/non-removable, volatile/non-volatile computer system storage media. By way of example only, storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, memory 404 may include at least one program product having a set (e.g., at least one) of program modules that are configured to carry out the functions of embodiments of the invention.

Program/utility 414, having a set (at least one) of program modules 416, may be stored in memory 404 by way of example, and not limitation, as well as an operating system, one or more application programs, other program modules, and program data. Each of the operating system, one or more application programs, other program modules, and program data or some combination thereof, may include an implementation of a networking environment. Program modules 416 generally carry out the functions and/or methodologies of embodiments of the invention as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that although not shown, other hardware and/or software components could be used in conjunction with computer system/server 400. Examples, include, but are not limited to: microcode, device drivers, redundant processing units, external disk drive arrays, RAID systems, tape drives, and data archival storage systems, etc.

Additionally, software discovery system 300 may be attached to the bus system 406. This may represent a complete hardware or hardware/firmware embodiment of the inventive concept.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-RAY), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for a software discovery process, comprising
receiving at least one product identifier and a related product priority;
determining mandatory software items and non-mandatory software items for a software product, wherein the at least one product identifier is indicative of the software product, wherein the software product comprises the mandatory software items, regarding a product identifier of the at least one product identifier as invalid because it is not related to at least one mandatory software item;
determining at least one scan type for the mandatory software items of the at least one product identifier and related product priority for performing a priority-based software discovery in a given file system stored on a storage system, wherein the at least one scan type includes at least file size information;
performing the priority-based software discovery in the given file system stored in the storage system, starting with a first scan type, using a next scan type for the mandatory software items corresponding to the at least one product identifier, wherein the next scan type is used for the mandatory software items that require the next scan type and used for the mandatory software items that have a highest priority first, wherein the at least one product identifier and software item specific parameters are used for the next scan type; and
repeating a previous step of performing the priority-based software discovery with a next scan type until all scan types for the mandatory software items for the related product priority have been executed, wherein the priority-based software discovery is interruptible after the priority-based software discovery is performed for the related product priority.

2. The method according to claim 1, wherein the first scan type relates to a first mandatory software item of a first product identifier having a highest related priority.

3. The method according to claim 1, wherein information about mandatory and/or optional software items of a product identifier are received from a software catalog.

4. The method according to claim 3, wherein the parameters for scanning the file system for a software item are received from the software catalog.

5. The method according to claim 1, wherein the determining a scan type also comprises generating an optimized scan script using different parameters for different ones of the scan types.

6. The method according to claim 1, also comprising performing a software discovery for non-mandatory software items of a plurality of software products.

7. The method according to claim 6, wherein the determining a scan type for each mandatory software item of all product identifiers also comprises determining a scan type for each of an optional software item of each of the product identifiers.

8. The method according to claim 1, wherein the at least one product identifier is receivable via a user interface or from another data source.

9. A software discovery system, comprising:
a receiver configured to receive at least one product identifier and a related product priority;
a processor configured to determine mandatory software items and non-mandatory software items for a software product, wherein the at least one product identifier is indicative of the software product, wherein the software product comprises the mandatory software items, wherein the processor is further configured to regard a product identifier of the at least one product identifier as invalid because it is not related to at least one mandatory software item;
the processor is further configured to determine at least one scan type for the mandatory software items of the at least one product identifier and received related product priority for performing a priority-based software discovery in a given file system stored on a storage system;
a software discovery sub-system configured to perform the priority-based software discovery in the given file system on the storage system, starting with a first scan type, using a next scan type for the mandatory software items corresponding to the at least one product identifier, wherein the next scan type is used for the mandatory software items that require the next scan type and used for the mandatory software items that have a highest priority first, wherein the at least one product identifier and software item specific parameters are used for the next scan type, wherein the software discovery sub-system is also configured to repeat a previous step of performing the priority-based software discovery with a next scan type until all scan types for the mandatory software items for the related product priority have been executed, wherein the priority-based software discovery is interruptible after the priority-based software discovery is performed for the related product priority.

10. The software discovery system according to claim 9, wherein the first scan type relates to a first mandatory software item of a first product identifier having a highest related priority.

11. The software discovery system according to claim 10, also comprising a software catalog storage comprising information about mandatory and/or optional software items relating to a product identifier.

12. The software discovery system according to claim 11, wherein the software catalog storage also comprises parameters for scanning the file system for a software item.

13. The software discovery system according to claim 10, wherein the processor is further configured to generate an optimized scan script using different parameters for different ones of the scan types.

14. The software discovery system according to claim 10, wherein the software discovery sub-system is further configured to perform a software discovery for non-mandatory software items of a plurality of software products.

15. The software discovery system according to claim 14, wherein the processor is further configured to determine a scan type for each of an optional software item of each of the product identifiers.

16. The software discovery system according to claim 10, also comprising an interface configured to receive the at least one product identifier and a related product priority.

17. A computer program product for a software discovery process, the computer program product comprising a computer readable storage medium having program instructions embodied therewith, the program instructions being executable by one or more computing devices to cause the one or more computing devices to:
receive at least one product identifier and a related product priority;
determining mandatory software items and non-mandatory software items for a software product, wherein the at least one product identifier is indicative of the software product, wherein the software product comprises the mandatory software items, regarding a product identifier of the at least one product identifier as invalid because it is not related to at least one mandatory software item;
determine a scan type for the mandatory software items of of the at least one product identifiers and related product priority for performing a priority-based software discovery in a given file system stored in a storage system;
perform the priority-based software discovery in the given file system stored in the storage system, starting with a first scan type, using a next scan type for the mandatory software items corresponding to the at least one product identifier, wherein the next scan type is used for the mandatory software items that require the next scan type and used for the mandatory software items that have a highest priority first, wherein the at least one product identifier and software item specific parameters are used for the next scan type, and
repeat the previous step of performing the priority-based software discovery with a next scan type until all scan types for the mandatory software items for the related product priority have been executed, wherein the priority-based software discovery is interruptible after the priority-based software discovery is performed for the related product priority.

* * * * *